Patented May 4, 1943

UNITED STATES PATENT OFFICE 2,318,036

PREPARATION OF SURFACE-ACTIVE SULPHONATES

James Herbert Werntz, Brandywine Hundred, Del., assignor to E. I. du Pont de Nemours & Company, Wilmington, Del., a corporation of Delaware No Drawing. Application April 23, 1940, Serial No. 331,165

8 Claims. (Cl. 260—503)

This invention relates to the preparation of water-soluble sulphur-containing compounds which contain a preponderant proportion of surface-active sulphonates by the reaction of unsaturated acyclic or alicyclic hydrocarbons containing at least 6 carbon atoms with water-soluble compounds capable of yielding bisulphite ions in the presence of a catalyst. This invention relates further to the use of oxidizing agents, especially those which supply nascent oxygen, as catalysts for the reaction. More specifically this invention relates to the preparation of surface-active sulphonates by reacting acyclic or alicyclic hydrocarbons containing at least 6 carbon atoms and only one double bond with a water-soluble bisulphite in the presence of a catalytic amount of an oxidizing agent.

This invention has as an object to provide a novel and easily conducted process for preparing surface-active sulphur-containing compounds. A further object is to provide a chemical process for the manufacture of surface-active sulphonates which utilizes olefines which are cheap and readily available. A still further object is to provide suitable catalysts for promoting the reaction between olefines and water-soluble bisulphites. Other objects will appear hereinafter.

According to the present invention, the use of catalytic amounts of oxidizing agents and especially nascent oxygen promotes the reaction between bisulphite ions and unsaturated aliphatic and cycloaliphatic hydrocarbons. The products thus obtained are predominately sulphonates but with certain olefines small amounts of organic sulphites are also formed. In the case of the unsaturated aliphatic and cycloaliphatic hydrocarbons, which react scarcely at all even at elevated temperatures in the absence of a catalyst, the employment of peroxide catalysts results in high yields of sulphonic acid derivatives even at low temperatures and in the absence of actinic light.

According to the present invention, the addition of bisulphite ion to aliphatic double bonds takes place at normal temperatures and in complete darkness but the catalysts are also effective in conjunction with elevated temperatures and light. Under the catalytic conditions of this invention the bisulphite ion may be provided by dilute aqueous solutions of sulphurous acid whereby monomeric sulphonic acid derivatives of the unsaturated aliphatic hydrocarbon are formed.

The following examples illustrate but do not limit the invention. All parts are given by weight.

EXAMPLE I

*Reaction of di-isobutylene with ammonium bisulphite in the presence of hydrogen peroxide*

Five parts of di-isobutylene, 100 parts of water, 0.5 part of 30% hydrogen peroxide and 30 parts of an aqueous solution of ammonium bisulphite containing 28% sulphur dioxide were stirred together at room temperature. After about 90 hours the di-isobutylene was completely converted to a water-soluble reaction product.

EXAMPLE II

*Reaction of di-isobutylene with sodium bisulphite in the presence of ascaridole*

Eleven and two-tenths parts of di-isobutylene, 20.8 parts of sodium bisulphite, 1 part of ascaridole and 200 parts of water were stirred together at 80° C. After about 41 hours the di-isobutylene was completely converted to a water-soluble product which promoted the wetting of cotton in a mercerizing bath. Sodium nitrate may be used in place of ascaridole.

EXAMPLE III

*Reaction of cyclohexene with sodium bisulphite in the presence of oxygen under pressure*

Eight and two-tenths parts of cyclohexene, 20.8 parts of sodium bisulphite, 5 parts of kieselguhr and 200 parts of water were agitated at room temperature in a sealed glass bottle under an oxygen pressure of 14 lbs./sq. in. After shaking 46 hours the reaction mixture was filtered and the small amount of unreacted oil indicated that about 90% of the cyclohexene was converted to a water-soluble product.

EXAMPLE IV

*Reaction of cyclohexene with ammonium bisulphite in the presence of ascaridole*

Thirty-two and eight-tenths parts of cyclohexene, 71.4 parts of ammonium bisulphite, 2.4 parts of ascaridole and 800 parts of water were stirred together for 11 hours at 30° C. in a glass flask. The ascaridole was added at the rate of about 0.2 part per hour. At the end of 11 hours all of the cyclohexene was converted to water-soluble material. The pH of the reaction mixture was 5.8 at the start of the experiment and 6 at the end of the experiment. The hydrogen ion concentration was determined by means of a Beckmann pH meter. Analysis of the reaction mixture indicated it to contain 18.1 parts of ammonium bisulphite, 17.7 parts of ammonium bisulphate and 74 parts of ammonium cyclohexanesulphonate. A satisfactory manner of isolating the ammonium cyclohexanesulphonate was to pour one volume of the reaction mixture into about five volumes of absolute alcohol and filter off the precipitate. The clear filtrate was concentrated on the steam bath to small volume, more absolute alcohol was added, and the additional precipitate was filtered off. The alcoholic filtrate was then evaporated to dryness, whereupon 65 parts of product in the form of plates was obtained. Analytically pure ammonium cyclohexanesulphonate was obtained by recrystallization from hot absolute alcohol (calculated: N, 7.74%; found: N, 7.8%). The ammonium cyclohexane sulphonate was characterized by conversion to cyclohexane sulphonyl chloride by reaction with phosphorus pentachloride. The cyclohexanesulphonyl chloride was treated with ammonia and converted to analytically pure cyclohexanesulphonamide melting at 94° C. (calculated: S, 19.62%; found: S, 19.7%).

EXAMPLE V

*Reaction of cyclohexene with ammonium bisulphite in the presence of sodium perborate*

Sixteen and four-tenths parts of cyclohexene, 40 parts of ammonium bisulphite, 1.6 parts of sodium perborate and 400 parts of water were stirred together in a glass reaction vessel at 32° C. The pH of the reaction mixture was 2.9. At the end of about 100 hours all of the cyclohexene was converted to water-soluble product.

EXAMPLE VI

*Reaction of cyclohexene with ammonium bisulphite in the presence of hydrogen peroxide*

Fifty parts of cyclohexene, 80 parts of ammonium bisulphite, 4 parts of hydrogen peroxide and 800 parts of water were stirred together in a glass reaction vessel at 32° C. The pH of the reaction mixture was 3.5 at the start and 1.7 at the end of the experiment. All of the cyclohexene was converted to water-soluble product at the end of 90 hours.

EXAMPLE VII

*Reaction of pinene with sodium bisulphite in the presence of nitric acid*

Thirteen and six-tenths parts of pinene, 20.8 parts of sodium bisulphite, 39 parts of ethyl alcohol, 50 parts of water and 1.5 parts of 70% nitric acid were agitated in a stainless steel bomb heated to 125–150° C. for 24 hours. The reaction mixture was steam distilled and the oil layer in the distillate was separated and amounted to 3.3 parts, indicating that about 75% of the pinene had been converted to water-soluble product. The reaction mixture was next evaporated to dryness on the steam bath and was then suspended in hot ethanol, neutralized with sodium hydroxide and filtered. The filtrate was evaporated, and the solid product was dried to constant weight in a vacuum desiccator over phosphorus pentoxide. A brown, brittle, resin-like product was obtained which was very soluble in water and did not decolorize iodine solution. It was readily soluble in 22% sodium hydroxide. The product analyzed 13.4% sulphur; the calculated value for sodium pinanesulphonate was 13.3%. The sodium pinanesulphonate was an excellent wetting agent when used in mercerizing baths. Instead of 70% nitric acid one may use 30% hydrogen peroxide.

EXAMPLE VIII

*Reaction of pinene with sodium bisulphite in the presence of pinene peroxide*

Eight and six-tenths parts of pinene, 5 parts of pinene which had been blown with air for 90 minutes on a steam bath, 39 parts of ethyl alcohol, 50 parts of water and 20.8 parts of sodium bisulphite were agitated in a nickel bomb 24 hours at 125–150° C. The reaction mixture was steam distilled and 7 parts of oil were recovered, indicating a conversion of about 48% to water-soluble product.

EXAMPLE IX

*Reaction of pinene with ammonium bisulphite in the presence of ascaridole*

Ninety parts of 45% ammonium bisulphite solution, 350 parts of water, 10 parts of concentrated ammonium hydroxide solution, 27.2 parts of pinene and 2 parts of ascaridole were stirred together in a glass lined reaction vessel for three days in a dark room at a temperature of about 5° C. An additional 2 parts of ascaridole was added and stirring continued for an additional three days. All of the pinene was reacted by this time. The pH dropped from 5.8 to 1.4. Analysis of the reaction mixture indicated it to contain 3 parts of unreacted ammonium bisulphite. The ammonium pinane sulphonate was recovered by pouring the reaction mixture into absolute alcohol, filtering off the inorganic material and concentrating the alcohol solution on the steam bath. The residue was a brownish-colored, brittle, resinous, very hygroscopic solid. The ammonium pinanesulphonate thus isolated was readily soluble in 22% aqueous sodium hydroxide solution, in methanol, and in ethanol, but insoluble in chloroform. It was found to be a good wetting agent for use in mercerizing liquors. A mixture of pinene and di-isobutylene may be used in place of pinene.

EXAMPLE X

*Reaction of pentadecene-8 with sodium bisulphite in the presence of potassium dichromate*

Eleven and five-tenths parts of pentadecene-8, 10.4 parts of sodium bisulphite, 1 part of potassium dichromate, 39 parts of ethyl alcohol, and 50 parts of water were agitated in a steel bomb 24 hours at 150° C. The reaction mixture was heated on the steam bath to drive off the alcohol, and an insoluble oil layer separated. An aqueous solution of the reaction product foamed strongly and wet powdered sulphur rapidly. Sodium nitrite may be used in place of potassium dichromate.

EXAMPLE XI

*Reaction of pentadecene-8 with sodium bisulphite in the presence of ammonium nitrate*

Fifteen and eight-tenths parts of pentadecene-8, 10.4 parts of sodium bisulphite, 78 parts of ethyl alcohol and 1.5 parts of ammonium nitrate were rotated in a Monel metal bomb 24 hours at 150° C. The reaction mixture was filtered and the alcohol solution evaporated on the steam bath. The resulting product consisted of an oil layer and a lower viscous layer. The lower viscous layer dissolved in water to give a clear, strongly and persistently foaming solution which wet powdered sulphur very rapidly.

EXAMPLE XII

*Reaction of tetra-isobutylene with sodium bisulphite in the presence of ammonium nitrate*

Twenty-two and four-tenths parts of tetra-isobutylene, 11.5 parts of sodium bisulphite, 2 parts of ammonium nitrate, 10 parts of kieselguhr and 100 parts of water were stirred together, in a glass reaction vessel equipped with a reflux condenser, at 101° C. for 50 hours. The product was filtered from the kieselguhr, and the filtrate steam distilled after neutralizing with sodium hydroxide solution. The solubilized tetra-isobutylene was readily soluble in water to give strongly foaming solutions which wet powdered sulphur rapidly.

EXAMPLE XIII

Reaction of divinylacetylene with ammonium bisulphite in the presence of oxygen Twenty parts of divinylacetylene, 198 parts of ammonium bisulphite, 3000 parts of water and 10 parts of kaolin were vigorously agitated in a shaker tube while maintaining an oxygen pressure equal to ½–¾ inch of mercury. The pH was maintained at 5 to 5.6 by adding ammonia as needed. At ½ to ¾ hour intervals the atmosphere above the flask was swept with oxygen. After shaking about 12 hours in the presence of oxygen an 83% yield of water-soluble product isolated as the barium salt was obtained. Analysis of the barium salt for sulphur and bromine number indicated its formula to be $(C_6H_7SO_3)_2Ba$.

EXAMPLE XIV

Reaction of hexene-3 with ammonium bisulphite in the presence of oxygen

Twenty-one parts of hexene-3, 198 parts of ammonium bisulphite, 3000 parts of water and 10 parts of kaolin were vigorously agitated in a shaker tube while maintaining an oxygen pressure equal to ½–¾ inch of mercury. The pH was maintained at 5 to 5.6 by adding ammonia as needed. Iodometric titrations were made from time to time to determine the bisulphite consumption. After 12 hours 95 to 98% of the ammonium bisulphite was consumed. Steam distillation yielded no unreacted hexene-3. Hot barium hydroxide solution was then added until the mixture after prolonged boiling remained permanently alkaline and no further evolution of ammonia was observed. The mixture was then filtered hot, and evaporated to dryness in a vacuum oven at 60° C. An organic sulphur content of 13.6%, and a bromine number of 59 indicates this product to be a mixture of barium salts containing 57% of the hexane sulphonate, 39% of the hexene sulphonate and 4% of the hexyl sulphite.

The following tabulation of experiments indicates that a large excess of sodium bisulphite in low concentrations in water is most favorable for solubilizing hexene-3.

| Experiment | Concentration NaHSO₃ in H₂O | Mole ratio NaHSO₃ hexene-3 | Per cent hexene-3 solubilized |
|---|---|---|---|
| 1 | 12 | 1 | 21 |
| 2 | 7.8 | 2 | 50 |
| 3 | 6.5 | 4 | 80 |

EXAMPLE XV

Reaction of cyclohexene with sulphurous acid in the presence of ascaridole

Fifty parts of sulphurous acid, 750 parts of water, 32.8 parts of cyclohexene and 2.2 parts of ascaridole were stirred together for 11.5 hours at 25° C. The pH of the reaction mixture was 0.8–1.2. The consumption of sulphurous acid was followed by iodometric titrations of samples removed every hour. At the end of the experiment 60% of the available sulphurous acid was consumed. The unreacted cyclohexene amounted to 12.3 parts indicating a conversion of 62%. The product was isolated by allowing the clear aqueous solution to evaporate at room temperature and drying the brownish colored residue to constant weight over phosphorus pentoxide in a vacuum desiccator. Five hundred parts of aqueous solution yielded 30 parts of a very viscous oil which slowly crystallized. The strongly acidic product was very soluble in water, dilute alkali, acetone, and ethanol. It was insoluble in hot petroleum ether and in chloroform. The sulphonic acid was characterized by conversion to an oily sulphonyl chloride with phosphorus pentachloride and to a solid sulphonamide by treating the sulphonyl chloride with ammonia.

Preferred catalysts for this reaction are oxidizing agents which are soluble in the olefines. Organic peroxides are particularly effective, and the peroxide of the unsaturated compound undergoing reaction with a bisulphite ion is a preferred example of this class of peroxides. Other effective organic peroxides include ascaridole, acetyl peroxide, benzoyl peroxide, peracetic acid, sodium peracetate, etc. Ozonized olefines or paracetaldehyde stored in contact with air may be used as catalysts. Inorganic peroxides may also be employed to advantage. These include such peroxides as hydrogen peroxide, sodium peroxide, sodium perborate, perboric acid, sodium percarbonate, etc. All the oxidizing agents that are solids or liquids at the reaction temperature are preferred catalysts for the reaction. Oxidizing agents which normally are gases at atmospheric pressure are the least preferred of the catalysts, since it is necessary to operate under a positive pressure of these oxidizing agents in order to obtain a substantial accelerating effect. Such gaseous oxidizing agents include oxygen, air, and the oxides of nitrogen, such as nitric oxide and nitrogen dioxide. Inorganic oxidizing agents which serve to catalyze the reaction include potassium dichromate, magnesium perchlorate, perchloric acid, sodium chlorate, nitric acid, potassium nitrate, ammonium nitrate, sodium nitrate, mercuric nitrate, silver nitrate, calcium nitrate, barium nitrate, strontium nitrate, lead nitrate, cobalt nitrate, sodium nitrite, etc.

In connection with the active catalysts I may use, in addition, promoter catalysts or the active catalysts may be deposited on the promoter catalysts. As promoter catalysts, I mean to include such activating materials as kieselguhr, kaolin, pulverized charcoal, gas carbon black, powdered silica gel, vermiculite, diatomaceous earth, fuller's earth, Japanese acid clay, bentonite, and natural silicates such as Indianaite.

Under comparable conditions reaction is about six times faster with ascaridole than with hydrogen peroxide and at least three times better than oxygen under pressure. Kieselguhr in water in a closed system at 25° C. does not catalyze addition of sodium bisulfite to cyclohexene, but when oxygen is introduced under pressure addition takes place. Ozonized olefins and hydrogen peroxide and several other strongly oxidizing materials are quite effective at lower temperatures but rapidly lose their effectiveness at elevated temperatures. Ascaridole may be used effectively at 100° C. but at high temperatures the inorganic oxidizing agents appear to be most effective. It is generally desirable not to employ strong oxidizing agents since they appear to lose their reactivity rapidly. Molecular oxygen oxidizes bisulphites very rapidly, and is not as desirable a catalyst as the peroxides.

Concentration of the bisulphite has a marked influence on the reaction. Experiments carried out with cyclohexene showed that using oxygen under pressure at 25° C. a 10% aqueous solution of sodium bisulphite reacted about four times faster than a 40% aqueous solution of sodium bisulphite using ascaridole as the catalyst, despite the fact that ascaridole is generally at least three times more efficient than oxygen under pressure. While water-soluble bisulphites react with aliphatic unsaturated hydrocarbons under the conditions of this invention at higher concentrations, in general, I prefer to employ concentrations of 20% or less in some polar solvent. When using sulphurous acid as the source of bisulphite ion it is apparently necessary to employ concentrations of 20% or less in order to obtain sulphonic acids.

The catalytic effect of nascent oxygen has been observed for temperatures ranging from below 0° C. up to and including 175° C. Temperatures beyond these preferred limits may be used if desired. No "ceiling" temperature has been observed for the addition of bisulphite ions to aliphatic double bonds above which temperature reaction ceases to take place. Since water or alcohols are the preferred solvents for the reaction, temperatures lower than 0° C. may be used but not so low as to cause the solvent medium to freeze. When operating at temperatures above the boiling point of water or of the alcohol employed as the solvent medium, it is necessary to operate under pressure. Thus in experiments at 150° C. the reactions were carried out in sealed metal bombs. It has also been found necessary when operating with gaseous oxidizing agents, such as air or elementary oxygen, to maintain a substantial partial pressure of these gases so as to provide an adequate quantity of the oxidizing agent to catalyze the reaction. It has been observed, for example, that simply sealing up a reaction mixture in an atmosphere of air and shaking for several days results in substantially no reaction, apparently because of an inadequate supply of oxygen being present.

The reaction is sensitive to the hydrogen ion concentration. When operating in water solutions the preferred range is pH 2 to pH 6. Thus, experiments carried out with cyclohexene and ammonium bisulphite demonstrated that at pH 9 practically none of the hydrocarbon reacted in the presence of ascaridole at 25° C. In the presence of ascaridole and air the reaction of cyclohexene with ammonium bisulphite is somewhat slower at pH 5.8 than at pH 3, but there is substantially less oxidation of the bisulphite at pH 5.8 than under the more acidic conditions. Under certain conditions the reaction becomes more acidic and it becomes necessary to add a buffering agent in order to maintain the pH at a constant figure. The reaction proceeds slowly with sulphurous acid at pH 1, and only 60% of the cyclohexene is consumed after 11.5 hours, whereas all of the cycohexene reacts in about half this time at pH 3.

While any "polar" solvent or solvent which promotes formation of bisulphite ions may be used, water, methanol, methanol-water, ethanol-water, and ethanol, have proved to be excellent solvents for carrying out the reaction and are preferred. The type of solvent to be employed depends upon the temperature to be used and upon the reactants. Water is the best solvent when the unsaturated hydrocarbon is readily miscible or soluble in it. When unsaturated hydrocarbons are used which are quite insoluble in water, it is sometimes better to employ an alcohol or a mixture of an alcohol and water as the solvent. When using sodium bisulphite, methanol is preferred to ethanol since sodium bisulphite is about 15 times more soluble in methanol than in ethanol. Methanol and ethanol are preferred to dimethyl-formamide, ethyl ether and dioxane as solvents because of the higher solubility of sodium bisulphite in the alcohols and the higher efficiency of the alcohols.

Any water-soluble bisulphite or compound capable of yielding bisulphite ions ($HSO_3-$) may be employed in the reaction. While I have usually used sodium bisulphite, ammonium bisulphite, aniline bisulphite, or free sulphurous acid I may also employ dimethylamine bisulphite, methylamine bisulphite, dimethylaniline bisulphite, pyridine bisulphite, triethanolamine bisulphite, calcium bisulphite, potassium bisulphite, etc. Under certain conditions sulphurous acid may be reacted jointly in the presence of a base such as ammonia, methylamine, triethanolamine, etc., and the same effect is obtained as if a bisulphite were present. At normal temperatures, ammonium bisulphite appears to react somewhat better than sodium bisulphite.

The process of this invention is most satisfactory for solubilizing the non-conjugated unsaturated hydrocarbons containing six or more carbon atoms. Specific examples of hydrocarbons that I may use include: camphene, pinene, cyclohexene, limonene, tridecene-7, nonadecene-10, 3,9 diethyl tridecene-6, hexene-3, di-isobutylene, dodecene-1, dodecyl-cyclohexene, tri-isobutylene, tetra-isobutylene, di-amylene, octene-1, tri-isoamylene, hexadecene-1, pentadecene-8, heptadecene-7, heptadecene-8, heptadecene-9, olefines by decarboxylation of such acids as oleic acid, 10-undecylenic acid, etc. In general, I find that unsaturated hydrocarbons respond well to catalysis by oxidizing agents and in particular nascent oxygen. The great reactivity of the unsaturated hydrocarbons is probably due to their readiness to form peroxides.

Another class of unsaturated hydrocarbons which may be employed in this process are the conjugated olefines. These compounds also respond to the catalytic effect of oxidizing agents in general and to nascent oxygen in particular. A few examples of conjugated unsaturated hydrocarbons that may be used include divinylacetylene, dimethylbutadiene and olefines obtained by decarboxylation of such acids as eleostearic acid, linolenic acid, cottonseed oil acids, corn oil acid, perilla oil acid, octadecadienoic acid, and ricinenic acid.

It is evident that this process is applicable to a wide range of hydrocarbons, that certain olefines react more readily than other olefines, and that certain of the olefines respond to the catalytic effect in a different manner than some other olefines. It is also evident that all types of mixtures and combinations of the foregoing disclosed hydrocarbons can be employed for this process. Obviously one combination of olefines will lead to one type of result, while other combinations will yield still different results. For example, I have observed that certain olefines react much more sluggishly than other olefines, and therefore the presence of large amounts of the less active olefines will tend to retard the reaction of the more reactive olefines. On the other hand, the addition of highly reactive olefines, or even of olefines capable of forming peroxides readily, to inactive olefines serves to activate the reaction of the less active olefine with the bisulphites.

Proper agitation of the reaction mixture is frequently necessary for successful results. As an example of this, pinene was heated in an ethanol-water mixture containing ammonium nitrate in a sealed glass tube at 145° C. and practically none reacted. When agitation was employed a high yield of water soluble product was obtained from the reacting pinene.

The few known procedures for preparing aliphatic sulphonic acids involve the use either of powerful sulphonating agents usually at elevated temperatures on aliphatic compounds that in general have at least one tertiary carbon atom or of strong oxidizing agents on aliphatic thiols. Such processes are obviously not applicable to molecules that decompose under such strong sulphonating or oxidizing conditions. The bisulphite method of sulphonation offers a commercially attractive route to low-cost surface-active agents of high efficiency since readily available non-conjugated unsaturated hydrocarbons are converted in one step to the salt of the sulphonic acid. This process affords a simple and direct means of solubilizing a great variety of unsaturated hydrocarbons and does not involve the hitherto lengthy procedure of adding hydrogen bromide to the unsaturated bond, converting the bromide to a thiol group, oxidizing the thiol group with a vigorous oxidizing agent to a sulphonic acid group and finally neutralizing the free sulphonic acid with a basic compound. However, it was found by experiment that a great many unsaturated aliphatic hydrocarbons and especially the non-conjugated aliphatic hydrocarbons do not react with bisulphites at all or with such extreme slowness as to render the process impractical regardless of whether the reaction mixture was stirred in an atmosphere of air, or heated or subjected to actinic light. I have improved the bisulphite method of sulphonation by my discovery that the introduction of a substantial amount (5 to 10% of the unsaturated compound is usually adequate) of a liquid or solid oxidizing agent or even of a normally gaseous oxidizing agent, provided sufficient pressure is employed to result in its solution in the reaction mixture, served to catalyze the reaction so that non-conjugated unsaturated aliphatic hydrocarbons can be converted quantitatively to water-soluble sulphonates. The catalytic effect of the oxidizing agents is so pronounced that unsaturated hydrocarbons which previously reacted scarcely at all even at elevated temperatures can now be completely solubilized at low temperatures and in the absence of light.

This invention is especially useful in providing a direct route to water-soluble salts of aliphatic sulphonic acids. If desired the water-soluble salts such as sodium, ammonium, etc. may be converted to and isolated as less water-soluble salts, as for example, the barium or calcium salts. The free sulphonic acids are readily obtained by treating the barium or calcium sulphonates with sulphuric acid or orthophosphoric acid. The free sulphonic acids are also obtained by using in the process dilute aqueous solutions of sulphurous acid in place of water-soluble bisulphites.

The water-soluble salts of the aliphatic or cyclo-aliphatic sulphonic acids in which the hydrocarbon radical contains 6 or more carbon atoms are especially valuable as surface-active or capillary-active materials in that they have colloidal properties and may therefore be advantageously used in any process involving wetting, penetrating, deterging, dispersing, emulsifying, frothing, foaming, and kindred phenomena. The process of this invention is particularly useful as a direct route to the surface-active secondary alkyl monosulphonates described in my U. S. Patents 2,142,162; 2,187,338, and 2,187,339.

When in the specification and claims I mention nascent oxygen I mean to refer to oxygen at the moment of its formation, in which condition it is more active chemically, presumably on account of free single atoms being present. The term nascent oxygen does not include gaseous oxygen which contains substantially no free single atoms of oxygen and consists chiefly of molecular oxygen which is less active chemically.

The above description and examples are intended to be illustrative only and not to limit the scope of the invention. This invention extends to all modifications and variations which fall within the spirit and scope of the appended claims.

I claim:
1. A process for the preparation of water-soluble sulphur-containing compounds which contain a preponderant proportion of surface-active sulphonates which comprises agitating unsaturated hydrocarbons selected from the group consisting of acyclic and alicyclic hydrocarbons containing at least 6 carbon atoms and at least one double bond with a solution containing not more than 20% of a water-soluble compound capable of yielding bisulphite ions in a polar solvent in the presence of a catalytic amount of an oxidizing agent.

2. A process for the preparation of a surface-active sulphonate which comprises agitating an unsaturated hydrocarbon selected from the group consisting of acyclic and alicyclic hydrocarbons containing at least 6 carbon atoms and at least one double bond with a solution containg not more than 20% of a water-soluble bisulphite salt in a polar solvent in the presence of a catalytic amount of an oxidizing agent.

3. A process for the production of a surface-active sulphonate which comprises agitating an olefinic hydrocarbon selected from the group consisting of acyclic and alicyclic hydrocarbons containing at least 6 carbon atoms and only one double bond with a solution containing not more than 20% of a water-soluble bisulphite salt in a polar solvent in the presence of a catalytic amount of nascent oxygen.

4. A process as defined in claim 3 in which the nascent oxygen is supplied by an organic peroxide.

5. A process for the production of a surface-active sulphonate which comprises agitating an olefinic hydrocarbon selected from the group consisting of acyclic and alicyclic hydrocarbons containing at least 6 carbon atoms and only one double bond with a solution containing not more than 20% of sodium bisulphite in a polar solvent in the presence of a catalytic amount of nascent oxygen.

6. A process as defined in claim 5 in which the olefinic hydrocarbon is di-isobutylene.

7. A process as defined in claim 5 in which the olefinic hydrocarbon is pinene.

8. A process as defined in claim 5 in which the olefinic hydrocarbon is pentadecene-8.

JAMES HERBERT WERNTZ.